(12) United States Patent
Pirrallo

(10) Patent No.: US 6,318,515 B1
(45) Date of Patent: Nov. 20, 2001

(54) HOLD DOWN SPRING FOR A DRUM BRAKE

(75) Inventor: Frank Gerard Pirrallo, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/539,044

(22) Filed: Mar. 30, 2000

(51) Int. Cl.$^7$ ................................................. F16D 55/00
(52) U.S. Cl. ............................................................ 188/78
(58) Field of Search ................................ 188/78, 325, 327, 188/328, 334, 337, 340, 341; 248/612; 415/523, 337

(56) References Cited

U.S. PATENT DOCUMENTS 5,368,139 * 11/1994 Pirrallo ................................... 188/78
5,836,429 * 11/1998 McGuire ............................... 188/340

* cited by examiner

Primary Examiner—Christopher P. Schwartz
Assistant Examiner—C. T. Bartz
(74) Attorney, Agent, or Firm—Robert M. Sigler

(57) ABSTRACT

A hold down spring for yieldably securing a drum brake shoe to a drum brake backing plate includes a nail that extends through apertures in the backing plate and in the brake shoe. A coil spring circumscribes the nail and urges a spring retainer slidable on the nail away from the brake shoe. The nail extends through an elongated slot in the retainer, which includes a wider portion which accepts an expanded end of the nail and a narrower portion which is narrower than the expanded end but wide enough to permit the nail to freely slide along the slot. The slot is inclined toward the brake shoe, so that the action of the spring tends to force the nail within the slot toward a seating area at one end of the slot. Errors in assembling the hold down spring is avoided, since if the nail is engaged with any part of the narrower portion of the spring will urge the nail toward the seating area, and if the nail remains in the wider portion of the slot, the spring will push the retainer off of the nail when the retainer is released, thereby making the mistake evident.

3 Claims, 3 Drawing Sheets

HOLD DOWN SPRING FOR A DRUM BRAKE

TECHNICAL FIELD

This invention relates to a hold down spring for yieldably securing a drum brake shoe to a drum brake backing plate.

BACKGROUND OF THE INVENTION

Drum brake shoes are secured to a drum brake backing plate by drum brake hold down springs, which secure the brake shoes to the backing plate while allowing for movement of the brake shoes relative to the backing plate when a brake application is effected. Hold down springs include a nail which extends through apertures in the backing plate and the brake shoe, a coil spring circumscribing the nail, and a spring retainer slidable on the nail. The spring extends between the brake shoe web and the retainer. The hold down spring must be assembled when the brake is assembled, which requires substantial manual dexterity of the assembler, because of the relative small size and relative complexity of the various components of the drum brake.

One hold down spring design is disclosed in U.S. Pat. No. 5,368,139, which discloses a hold down spring in which the spring retainer is assembled onto the nail by first forcing the retainer downwardly over the nail so that the enlarged end of the nail is received in a wider portion of an opening in the retainer as the spring is compressed, and then moving the retainer laterally to seat the nail in a narrower portion of the opening. The lateral movement of the retainer requires manual dexterity, and it is difficult to determine if the nail is properly seated.

SUMMARY OF THE INVENTION

According to the invention, the retainer of a drum brake hold down spring is provided with a slot having a wider portion through which the expanded end of the nail is received and a narrower portion defining a seating area for the nail. A narrower inclined portion of the slot extends between the wider portion and the abutment surface. Accordingly, once the nail is received within any part of the narrower section of the inclined portion of the slot after having been installed through the wider portion of the slot and released, the action of the spring tends to force the nail along the inclined portion of the slot and into seating area. An improperly installed retainer is obvious, since if the nail is not received within the narrower inclined portion of the slot the spring will push the retainer off of the nail, and once the nail is received within the narrower inclined portion of the slot the nail will be urged into the proper seating area.

DESCRIPTION OF THE PREFERRED EMBODIMENT

Figure 1:
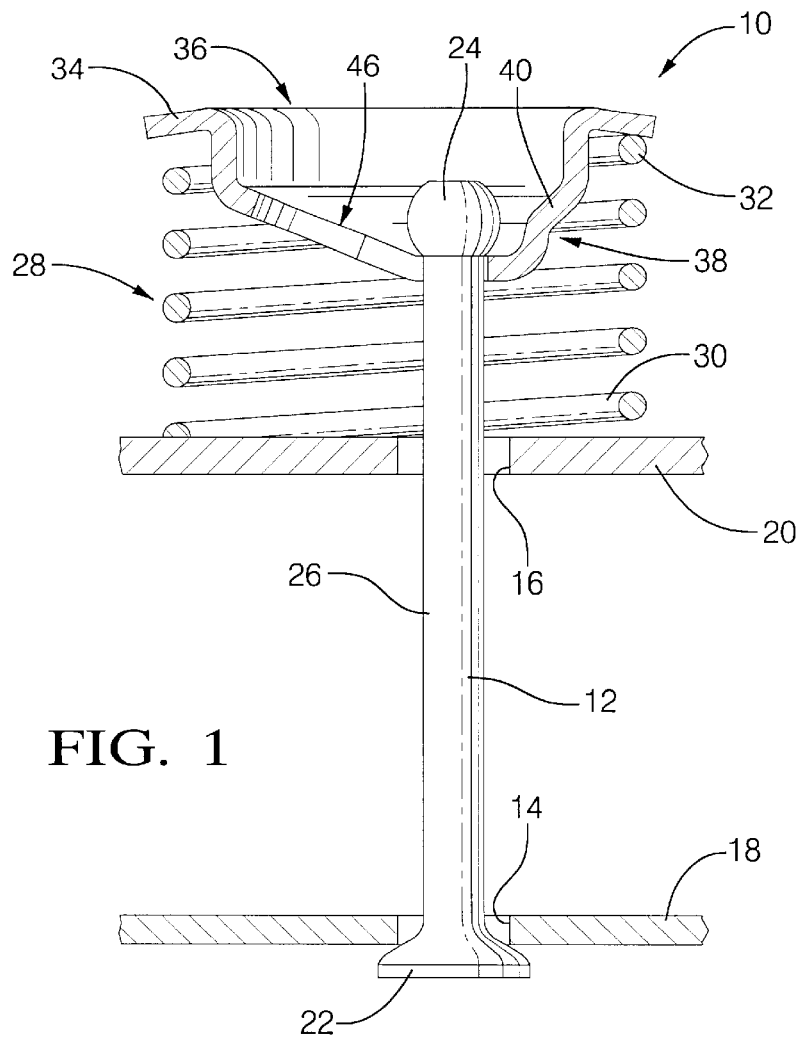
FIG. 1 is a fragmentary cross sectional view of an assembled hold down spring made according to the present invention with a portion of the brake shoe and backing plate as used in a typical drum brake.
Figure 2:
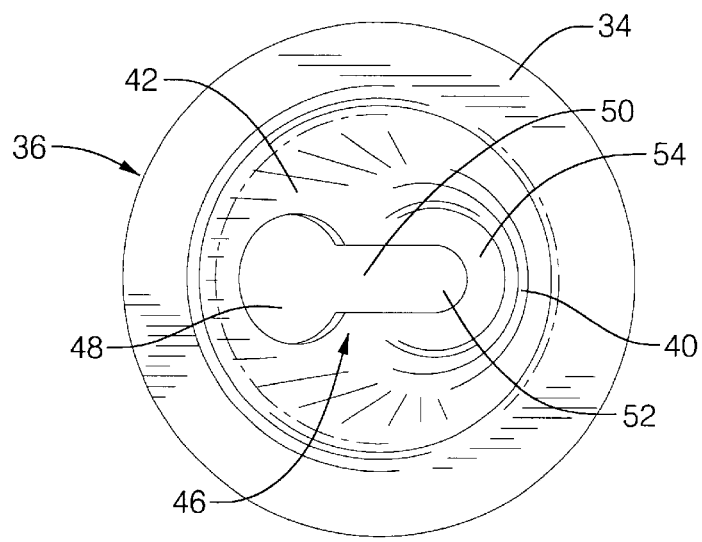
FIG. 2 is a top plan view of the spring retainer used in the hold down spring illustrated in FIG. 1.

Referring now to the drawings, a hold down spring made according to the teachings of the present invention is generally indicated by the numeral 10 and includes a nail 12 extending through an aperture 14 in a conventional drum brake backing plate 18 and through an aperture 16 in the web 20 of a conventional drum brake shoe. Nail 12 has an enlarged head 22 on one end thereof of sufficient size that the head 22 engages the backing plate 18 when the nail 12 is installed in the aperture 16 to limit movement of the nail 12 through the aperture 16. The opposite end of the nail 12 terminates in an expanded portion or tip 24 which is larger than the diameter of stem portion 26 of the nail 12, but is small enough to pass through the apertures 14 and 16.

The nail 12 is circumscribed by a coil spring generally indicated by the numeral 28. Lower coil 30 of coil spring 28 bears against the web 20 of the brake shoe and upper coil 32 of coil spring 28 bears against a radially outwardly projecting rim 34 of a cup-shaped spring retainer 36, which is slidably mounted on the nail 12 as will hereinafter be described. Accordingly, the retainer 36 is urged upwardly, viewing the Figures by the spring 28, until the retainer 36 engages the expanded portion 24 of the nail 12. The rim 34 circumscribes a contoured surface of retainer 36 which is generally indicated by the numeral 38. Contoured surface 38 includes a stepped portion 40 and a sloping portion defining a ramp 42. An inclined slot 46 extends through the ramp 42 of the retainer 36. The slot 46 includes an enlarged, wider inclined section 48 that is sufficiently large to permit the expanded portion 24 of the nail 12 to pass through the retainer 36 and a narrower section 50 that is sufficiently small to prevent the expanded portion 24 to pull through but is large enough to permit the nail to slide freely along the slot. The slot 46 terminates in a seating end portion 52 that is circumscribed by an abutment surface 54. Accordingly, when the nail 12 is properly seated in the seating end portion 52, the abutment surface 54 engages the expanded portion 24 of the nail 12, preventing the retainer from being pushed off of the nail 12 by the spring 28.

Figure 3:
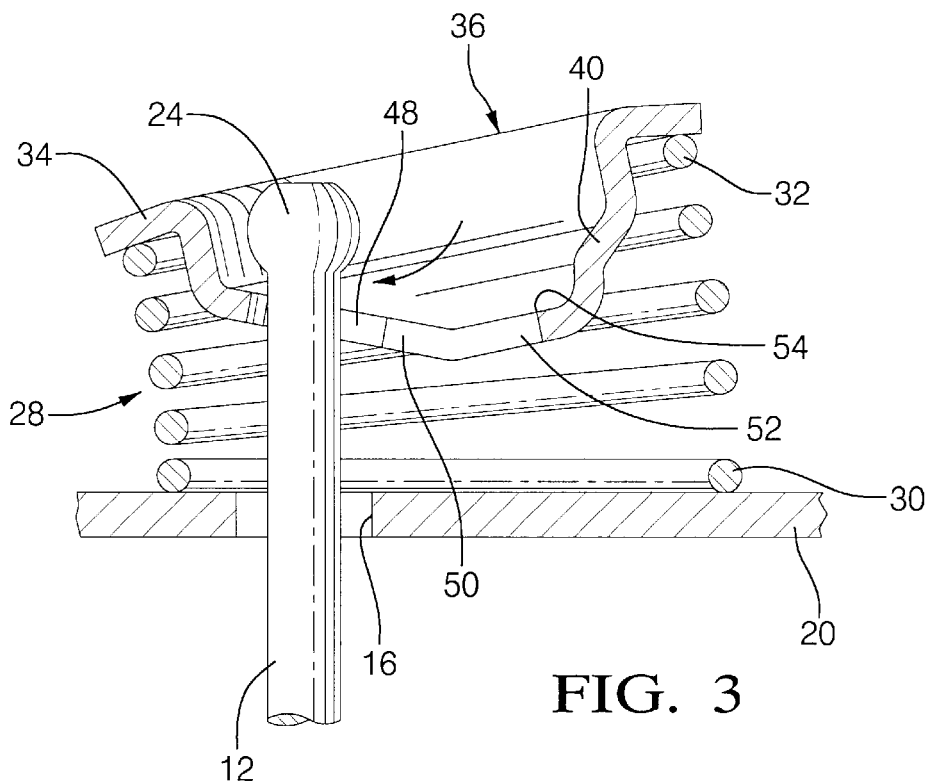
FIGS. 3 and 4 are views similar to a portion of FIG. 1, but illustrating the steps by which the retainer is installed on the nail and the nail properly seated in the seating area of the retainer.
Figure 4:
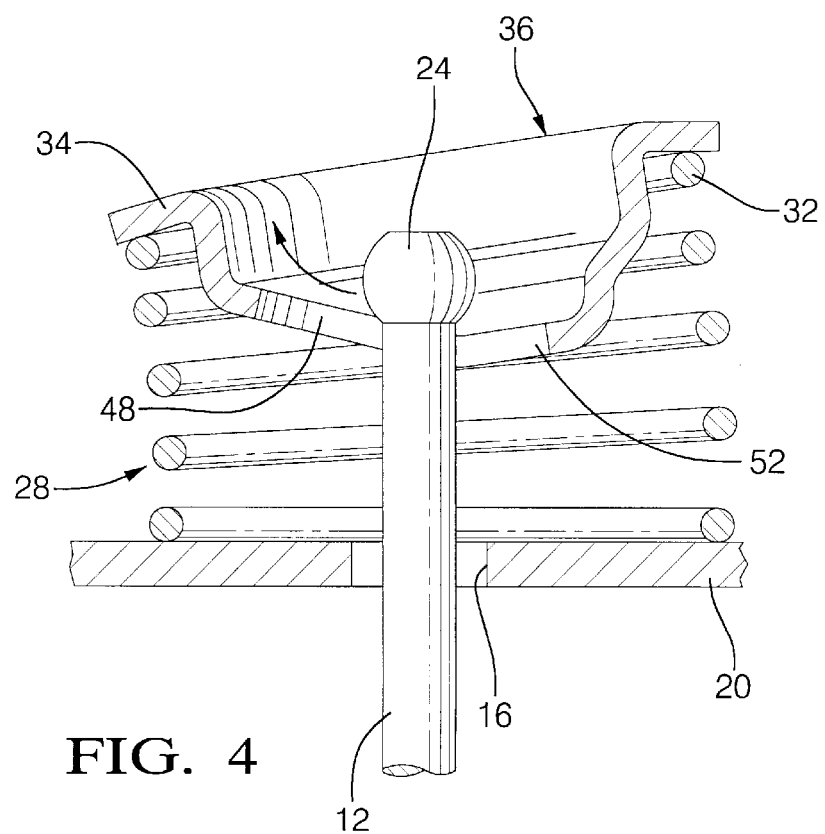
Figure 5:
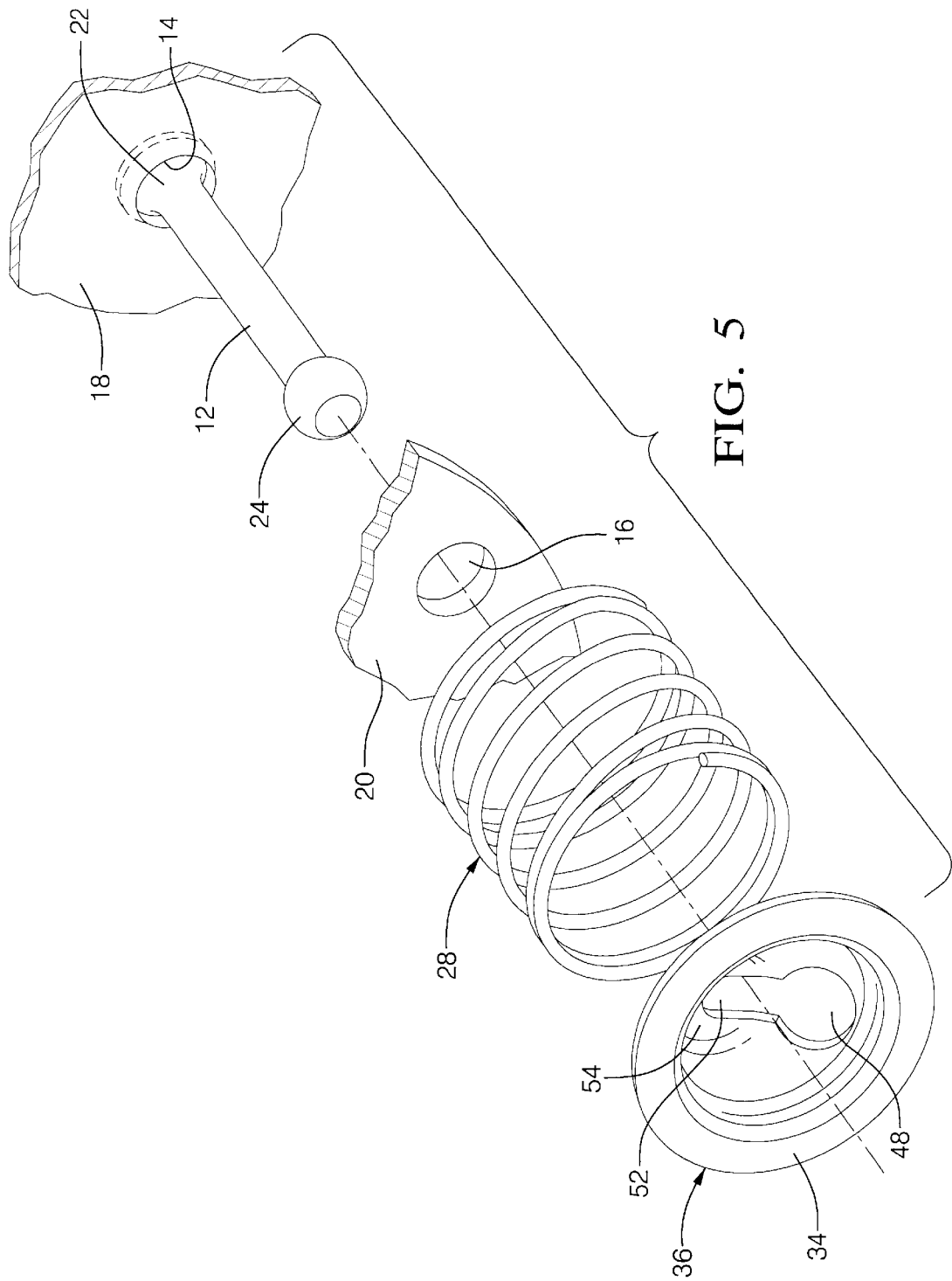
FIG. 5 is an exploded view in perspective of the hold down spring of FIGS. 1–4, with fragmentary portions of the brake shoe and backing plate also included.

When the drum brake upon which the hold down spring 10 is assembled, the nail 12 is installed through the aperture 14 in backing plate 18 and the brake shoe 20 is installed on the backing plate by installing the nail 12 through the aperture 16. The spring 28 is then placed over the nail 12, and the retainer 36 is installed on the nail 12 by forcing the retainer 36 downwardly toward the brake shoe 20, thereby compressing the spring 28, while at the same time forcing the expanded portion 24 of the nail 12 through the enlarged portion 48 of the slot 46. The retainer is then moved so that the nail is received within any portion of the narrower section 50 of the slot 46, as illustrated in FIG. 3. If the nail is not forced into the seating area 52, the action of the spring 28 in forcing the retainer upwardly also forces the nail 12 to ride down the section of the slot extending down the ramp portion 42, thereby causing the nail 12 to ride down the inclined portion of the slot until it reaches the seating area 52, so that the expanded portion 24 of the nail will engage the abutment surface 54. It will be noted that if the assembler fails to engage the nail with the narrower portion 50 of the slot 46 such that the nail remains in the wider section 50, the spring 28 will push the retainer 36 off of the nail, thus making the assembly error immediately evident.

What is claimed is:

1. Hold down spring for yieldably securing a drum brake shoe to one side of a drum brake backing plate comprising a nail having a head on one end thereof and an expanded portion on the other end thereof, said nail adapted to extend through apertures in said backing plate and in said brake shoe, a cup shaped spring retainer slidable on said nail and movable toward and away from said expanded portion, said head adapted to engage said backing plate to limit movement of the nail through the aperture in the backing plate, said retainer including a circumferentially extending rim circumscribing a contoured surface, and a spring adapted to bear against said brake shoe and the rim to urge the retainer toward said expanded end of the nail and away from said brake shoe, said nail adapted to extend through a slot in said contoured surface, said slot having an inclined portion sloping away from said rim and toward said brake shoe and a seating end portion circumscribed by an abutment surface on said retainer, said abutment surface adapted to engage said expanded portion of the nail when the nail is seated in the end portion of the slot, the inclined portion of said slot adapted to urge said nail therealong to be seated in said end portion of the slot with the expanded portion engaging the abutment surface, wherein the slot includes an enlarged, wider section sufficiently large to permit the expanded portion of the nail to pass therethrough and a narrower section sufficiently small to prevent the expanded portion from passing therethrough, said narrower section including said end portion circumscribed by said abutment surface and wherein said wider section is in the inclined portion of the slot.

2. Hold down spring for yieldably securing a drum brake shoe to one side of a drum brake backing plate comprising a nail having a head on one end thereof and an expanded portion on the other end thereof, said nail adapted to extend through apertures in said backing plate and in said brake shoe, a cup shaped spring retainer slidable on said nail and movable toward and away from said expanded portion, said head adapted to engage said backing plate to limit movement of the nail through the aperture in the backing plate, said retainer including a circumferentially extending rim circumscribing a contoured surface, and a spring adapted to bear against said brake shoe and the rim to urge the retainer toward said expanded end of the nail and away from said brake shoe, said nail adapted to extend through a slot in said contoured surface, said slot having an inclined portion sloping away from said rim and toward said brake shoe and a seating end portion circumscribed by an abutment surface on said retainer, said abutment surface adapted to engage said expanded portion of the nail when the nail is seated in the end portion of the slot, the inclined portion of said slot adapted to urge said nail therealong to be seated in said end portion of the slot with the expanded portion engaging the abutment surface, wherein the slot includes an enlarged, wider section sufficiently large to permit the expanded portion of the nail to pass therethrough and a narrower section sufficiently small to prevent the expanded portion from passing therethrough, said narrower section including said end portion circumscribed by said abutment surface and wherein said contoured surface of the retainer includes a sloping ramp portion and a stepped portion, said slot being defined in said sloping ramp portion.

3. Hold down spring for a drum brake comprising a nail having an expanded portion, said nail adapted to extend through a cup shaped spring retainer slidable on said nail, said retainer including a circumferentiaily extending rim circumscribing a contoured surface, and a coil spring adapted to circumscribe said nail and urge the retainer toward said expanded portion of the nail, said retainer defining a slot in said contoured surface through which said nail is adapted to extend, said slot having an inclined portion sloping away from said rim, and an end portion circumscribed by an abutment surface on said retainer, said abutment surface engaging said expanded portion of the nail when the nail is seated in the end portion of the slot, the inclined portion of said slot adapted to assist the spring in urging said nail therealong to be seated in said end portion of the slot, wherein the slot includes a wider section sufficiently large to permit the expanded portion of the nail to pass therethrough and a narrower section sufficiently small to prevent the expanded portion from passing therethrough, said narrower section including said end portion circumscribed by said abutment surface, and wherein said wider section is in the inclined portion of the slot.

* * * * *